(12) United States Patent
Harris

(10) Patent No.: US 6,891,541 B1
(45) Date of Patent: May 10, 2005

(54) GRAPHING CALCULATOR WITH MANUAL LINE DRAWING

(75) Inventor: Guy W. Harris, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/535,986

(22) Filed: Mar. 27, 2000

Related U.S. Application Data

(60) Provisional application No. 60/127,020, filed on Mar. 31, 1999.

(51) Int. Cl.[7] ............................................. G06F 15/00
(52) U.S. Cl. ..................... 345/443; 345/440; 345/441; 345/442
(58) Field of Search ................................ 345/443, 708, 345/440, 441, 442

(56) References Cited

U.S. PATENT DOCUMENTS

| | | | | |
|---|---|---|---|---|
| 4,794,553 A | * | 12/1988 | Watanabe et al. ...... | 364/710.01 |
| 5,309,553 A | * | 5/1994 | Mukai et al. ................ | 395/143 |
| 5,377,130 A | * | 12/1994 | Frank et al. ........... | 364/709.12 |
| 5,420,972 A | * | 5/1995 | Johnson, Jr. et al. ....... | 395/143 |
| 5,525,477 A | * | 6/1996 | Hassouna ..................... | 435/13 |
| 5,532,946 A | * | 7/1996 | Phipps et al. .......... | 364/710.14 |
| 5,550,964 A | * | 8/1996 | Davoust ..................... | 345/440 |
| 5,712,656 A | * | 1/1998 | Ikeda et al. ................. | 345/133 |
| 5,793,380 A | * | 8/1998 | Matsuno ..................... | 345/443 |
| 5,870,319 A | * | 2/1999 | Thornton et al. ...... | 364/710.01 |

OTHER PUBLICATIONS

Cromar et al, "Using the TI–73: A Guide for Teachers", p. 138–140, 1998.*

* cited by examiner

*Primary Examiner*—Matthew Luu
*Assistant Examiner*—David Chuy
(74) *Attorney, Agent, or Firm*—Bret J. Petersen; W. James Brady, III; Frederick J. Telecky, Jr.

(57) ABSTRACT

A graphing calculator (10) having manual line drawing capability. The calculator (10) is programmed to receive data representing the begin point and end point of a line (FIGS. 7 and 8), and to then draw a line that includes these points (FIG. 9). The display includes a display of the line equation (FIG. 9). The slope and y-intercept of the line may be adjusted using cursor direction keys. As the line is adjusted, it is redrawn and the line equation is re-calculated and displayed (FIG. 10).

12 Claims, 3 Drawing Sheets

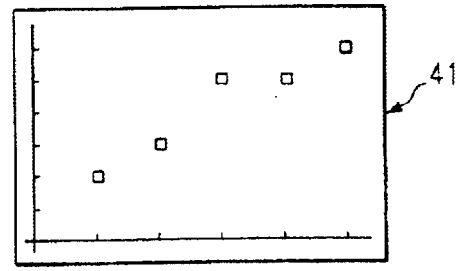
FIG. 3
FIG. 4
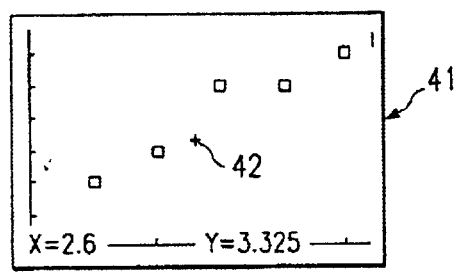
FIG. 5
FIG. 6
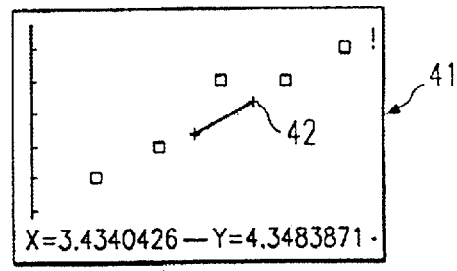
FIG. 7
FIG. 8

GRAPHING CALCULATOR WITH MANUAL LINE DRAWING

This application claims priority under 35 USC § 119(e)(1) of provisional application No. 60/127,020 filed Mar. 31, 1999.

TECHNICAL FIELD OF THE INVENTION

This invention relates to electronic calculators, and more particularly to calculator having a manual line fitting feature.

BACKGROUND OF THE INVENTION

Electronic calculators have become an essential tool for students. Students of all levels have a wide choice of calculator types and models.

Many students still own relatively inexpensive scientific calculators, but recently more and more students are discovering the advantages of graphing calculators. Graphing calculators are characterized by a larger screen, which permits the entry of mathematical expressions in a logical format. They also permit graph displays and table displays. They have sophisticated programming capability. They often permit data transmission to other computing devices, directly or via a data storage medium, as well as data collection via various interface protocols. To the consternation of educators, they also have many recreational capabilities—and their users enjoy games that are often shared via the world wide web!

Particular calculator models are often designed for particular educational levels. For example, a calculator for middle school students might have less advanced features than one designed for older students. However regardless of the level for which a calculator is designed, a continual goal in designing them is to provide a logical and easy to use interface.

The graphing features of graphing calculators are often accompanied by various statistical functions. Such functions include regression analysis, in which a data set is analyzed to determine a line through the points. The calculator may display the line as well as the equation for the line. For example, the user may specify a regression type, to which the calculator automatically responds by executing a regression algorithm and drawing a line.

SUMMARY OF THE INVENTION

One aspect of the invention is a graphing calculator that provides a manual line drawing function. The calculator may be otherwise a conventional graphing calculator but uses certain features for manual line drawing. Namely, the calculator screen is capable of two-dimensional displays and of displaying at least straight lines in any direction and a cursor. A key panel has keys at least capable of selecting positions of the cursor and moving the cursor horizontally or vertically on said screen. A processor is operable to execute manual line drawing programming that instructs the processor to perform the following steps: receive a line begin point, receive a line end point, draw a line that includes said begin point and said end point, and redraw said line in response to said cursor keys. A memory stores manual line drawing programming.

An advantage of the invention is that the calculator permits lines to be manually drawn and adjusted, using the cursor keys to change either the slope or the y-intercept. Meanwhile, the equation for the current line is displayed. The display permits the user to easily learn the associations between a lines on a plot and their mathematical equations and to make the proper abstractions.

A further advantage of the invention is that it more naturally permits the learning of statistical line fitting analysis. As in traditional "paper and pencil" teaching, the user manually draws the line through a set of points and is able to visualize how the line fits the data.

BRIEF DESCRIPTION OF THE DRAWINGS

FIG. 3 illustrates an example of entering two dimensional data, a step of the method of FIG. 2.

FIG. 4 illustrates the generation of a scatter plot, a step of the method of FIG. 2.

FIG. 5 illustrates the selection of a manual line fitting function, a step of the method of FIG. 2.

FIG. 6 illustrates the assignment of a line to be drawn to a line equation, y=ax+b, a step of the method of FIG. 2.

FIG. 7 illustrates selection of a begin point for the line, a step of the method of FIG. 2.

FIG. 8 illustrates selection of an end point for the line, a step of the method of FIG. 2.

DETAILED DESCRIPTION OF THE INVENTION

Figure 1:
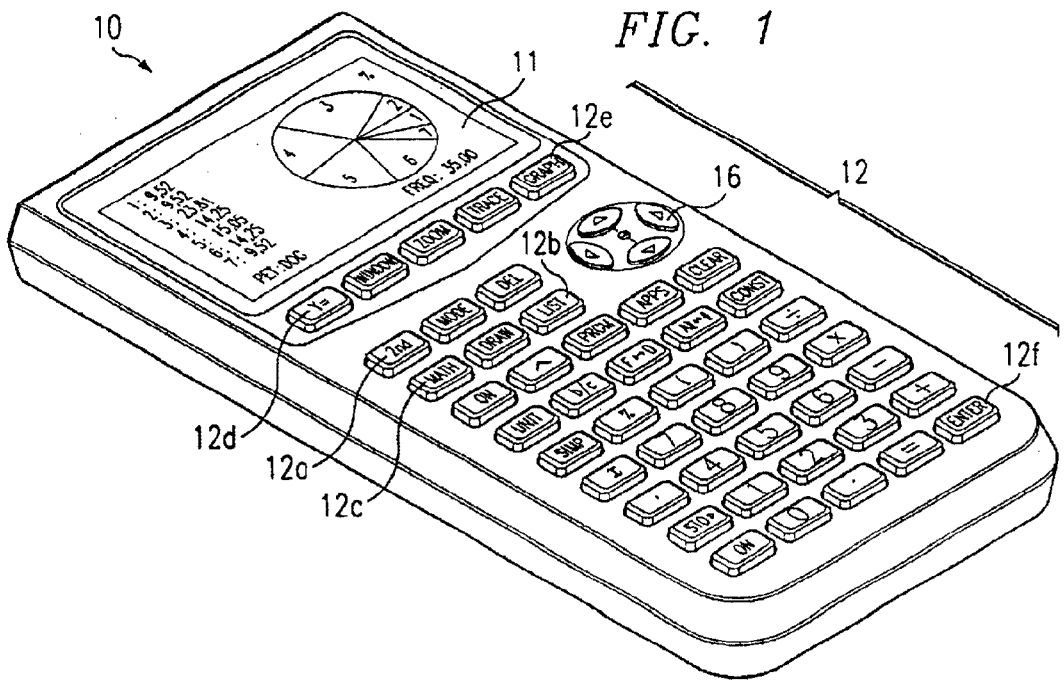
FIG. 1 illustrates the front panel of a calculator 10 having the manual line fitting features of the present invention.

FIG. 1 illustrates the front panel of a calculator 10, which has the manual line fitting features of the present invention. As explained below, a manual-fit function permits the user manually to fit a line to plotted data, as opposed to instructing calculator 10 to automatically draw the line. The line may be redrawn using the cursor keys. The display may include a display of the equation for the line, which is updated as the line is redrawn.

Calculator 10 is described herein in terms of particular software and hardware features of the TI-73, a commercially available graphing calculator manufactured by Texas Instruments Incorporated. Apart from the features of the present invention, many of the features of calculator 10 described herein are typical of graphing calculators. Other of its features are unique to the TI-73 or to its "family" of TI calculators.

The use of the TI-73 is for purposes of description, and does not limit the invention. The manual line fitting features that are the subject of the present invention could be incorporated into any other calculator that provides graphical displays.

In FIG. 1, the screen 11 of calculator 10 has a "graphical display", as that term is used herein. The display of FIG. 1 is a pie chart, but illustrates the ability of calculator 10 to draw straight lines in any direction. As will be made clear from the following discussion, the graphical display need not include the ability to draw curved lines.

In addition to the ability to draw graphical displays of various types, some of the software features of calculator 10 are stacked fractions, constant features, English and metric conversions, software applications loading and storage, keystroke programming. It also permits data collection, display and analysis.

Various hardware features include a large pixel screen 11, which is 64×96 pixels. A keypad 12 has various keys for data and command entry, some of which are used to implement the invention and are described herein. Other features are an I/O port for data linking, a 32 K byte RAM and 64 K byte application space, and a unit to unit link cable connection capability.

As is typical of calculators, calculator 10 has a secondary function key, 2nd key 12a, which permits other keys to have two functions. For example, by pressing 2nd key 12a and then Stat/List key 12b, the user enters the Stat function. For simplicity of explanation herein, a key having two functions is referred to in terms of the function appropriate for the context, i.e., when discussing the Stat function, Stat/List key 12b is referred to as the Stat key 12b.

Figure 2:
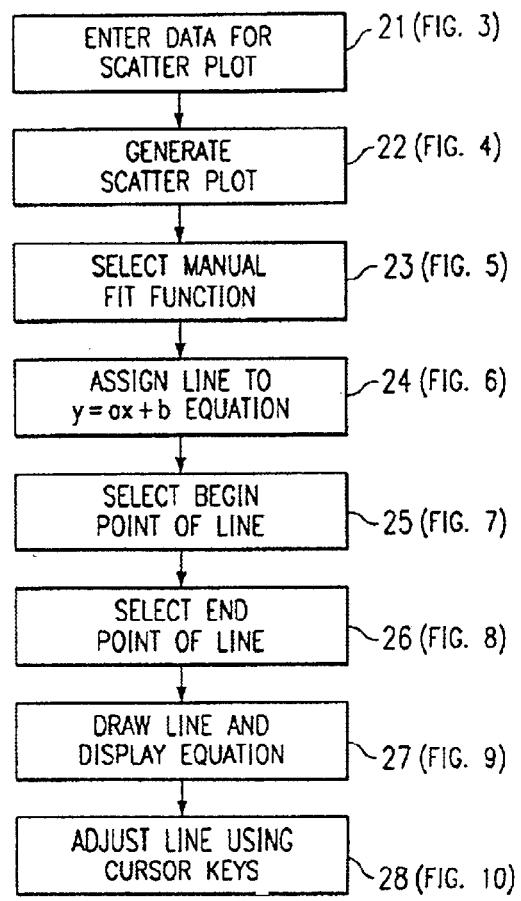
FIG. 2 illustrates the basic steps of using the calculator to perform manual line fitting in accordance with the invention.

FIG. 2 illustrates the basic steps of using calculator 10 to perform manual line fitting in accordance with the invention. FIG. 2 is drawn from the point of view of steps performed by the user. However, the same steps could be described in terms of activities performed by the computer. For example, steps involving entry of data by the user could also be described as receipt of data by the calculator.

Each of the steps of FIG. 2 is further illustrated by FIGS. 3–12. Each of these figures illustrates a different display on screen 11. Their reference numbers refer to the various displays and to items within the display.

FIG. 3 illustrates an example of Step 21, the data entry step. Calculator 10 is in a mode for receiving entry of data as one or more lists. A "list" is a set of numerical or text information. The data entry mode for a list is activated by calling a List Editor function, using the List key 12b. For a new list, the list is named by pressing the Text key 12c and entering appropriate text. A prenamed list can also be specified. In the example of FIG. 3, display 31 is formatted for three lists, L1, L2, and L3. The list elements are entered by using number keys of keypad 12 or the Text key 12c. Editing keys, such as the Ins, Clear, or Del keys, may be used to edit the data.

FIG. 4 illustrates Step 22, the scatter plot step. Display 41 is a scatter plot, which has been generated using the Plot key 12d and selecting a Plot Type of Scatter from a menu. The Graph key 12e is then used to draw the scatter points. By "scatter plot" is meant a plot of data points on an x-y axis.

FIG. 5 illustrates Step 23, the selection of a manual line fitting function. Step 23 is initiated by the user, who has used appropriate keys to display a menu header 51 and to select a Calc menu 52. Each item on the Calc menu 52 is a different option for calculating statistical analysis on a list. One of these options is a manual-fit option.

FIG. 6 illustrates Step 24, an optional step, which permits the user to assign the line to be drawn to a line equation, y=ax+b. In the example of FIG. 6, the line equation is assigned the identifier $Y_1$. FIG. 6 further illustrates how a line may be described in terms of a line variable display 61, which sets out various line variables associated with a particular line. These line variables are automatically calculated and stored, and the user may access them for a given line.

FIG. 7 illustrates Step 25, in which the user returns to the plot display 41, and uses the cursor 42 to select a begin point for the line. The cursor 42 is indicated with a symbol different from that of the plotted points, here a "+" symbol. The x and y coordinates of the cursor position are shown at the bottom of display 41.

FIG. 8 illustrates Step 26, in which the user uses cursor 42 to select an end point for the line. In the example of this description, cursor movement is performed with the cursor direction keys 16. As the cursor is moved from the begin point to the end point, a line between the two points is drawn.

In FIGS. 7 and 8, the begin and end points are selected by means of the cursor position. Alternative input methods are possible, such as entry of numeric data using number keys of key panel 12.

Figure 9:
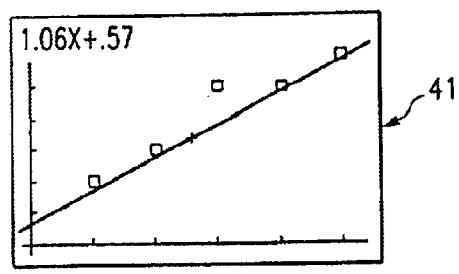
FIG. 9 illustrates the drawing of the line corresponding to the selected begin and end points, a step of the method of FIG. 2.

FIG. 9 illustrates Step 27, the drawing of the line. In the example of this description, this is accomplished by means of the Enter key 12f. The equation for the line, y=ax+b, is generated and displayed in the upper corner of display 41.

Figure 10:
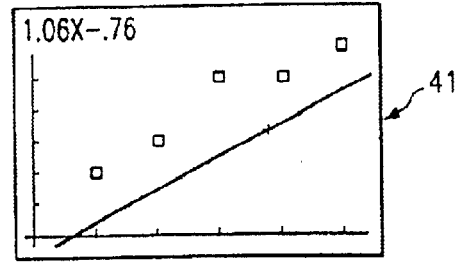
FIG. 10 illustrates how the line may be adjusted, a step of the method of FIG. 2.

FIG. 10 illustrates Step 28, during which the user may adjust the line. The y-intercept may be modified using the left and right cursor direction keys 16. The slope may be changed using the up and down cursor direction keys 16.

Figure 11:
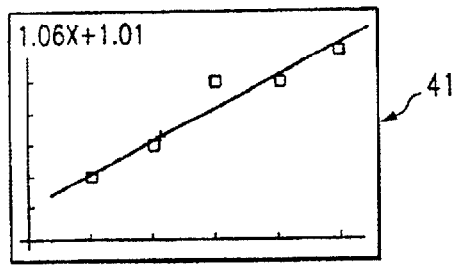
FIG. 11 illustrates a line adjusted for a best fit, a step of the method of FIG. 2.

FIG. 11 illustrates a "best fit" line and its corresponding equation. The best fit may be calculated by the user, who enters appropriate instructions to execute an appropriate regression algorithm or who performs a "paper and pencil" calculation. Or calculator 10 could automatically calculate the best fit, and the line or its equation displayed, automatically or in response to user key panel input. Other enhancements might include highlighting or otherwise indicating a line that is a "best fit" as the user adjusts the line.

Figure 12:
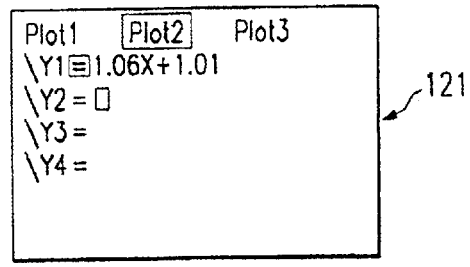
FIG. 12 illustrates a line editor display, which permits the line to be de-selected.

FIG. 12 illustrates a line editor display 121, which displays the equation for the line. In the example of this description, the line editor display 121 is activated by using the Y=key 12d. The manual-fit line may be deselected by selecting the "=" after $Y_1$ and pressing the Enter key 12f.

Figure 13:
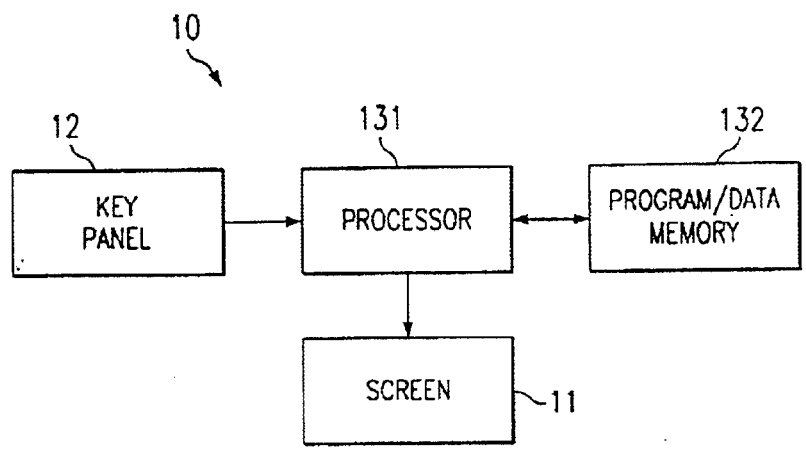
FIG. 13 illustrates the basic components of calculator 10.

FIG. 13 illustrates the basic components of calculator 10. Apart from the programming aspects of the present invention, these components may be implemented with known calculator design techniques and are not described at length herein. Processor 131 is programmed to perform the manual line fit function described above. The programming for this function and other calculator functions is stored in memory 132, which also stores data. Screen 11 and keypad 12 are described above.

Although the above description is in terms of line fitting for scatter plots, the line drawing features described above are useful independently of line fitting. For example, a line could be drawn on an otherwise blank screen, such that the user may adjust its slope or y-intercept in the manner described above. This feature alone is a valuable tool in teaching the mathematical abstractions associated with lines. Also, the line may be drawn in conjunction with plots other than scatter plots, as a means of illustrating a fit through any representation of data points.

Other Embodiments

Although the present invention has been described in detail, it should be understood that various changes, substitutions, and alterations can be made hereto without departing from the spirit and scope of the invention as defined by the appended claims.

What is claimed is:

1. A graphing calculator that provides a manual line drawing function, comprising:
   a screen capable of displaying at least straight lines in any direction and a cursor;
   a key panel having direction keys at least capable of selecting positions of said cursor and moving said cursor horizontally or vertically on said screen;
   a processor for executing manual line fit programming that instructs said processor to perform the following steps to allow the user to manually position a line on said screen;
   receive a plurality of data points and generate a plot of said data points on said screen;
   receive a line begin point,
   receive a line end point,
   draw a line on said screen that includes said begin point and said end point, and
   allow the user to manually position said line to using said direction keys to identify a new line location; and
   a memory for storing said manual line fit programming, wherein said processor is further programmed to receive a set of data points and to generate a scatter plot of said data points, such that said line may be drawn on said scatter plot.

2. The calculator of claim 1, wherein said line begin point and said line end point are received by means of selecting cursor locations on said screen having said data points.

3. The calculator of claim 1, wherein said line begin and said line end point are received by means of numerical data entry.

4. The calculator of claim 1, wherein said line is redrawn in response to said direction keys to adjust the y-intercept of said line.

5. The calculator of claim 1, wherein said line is redrawn in response to using said direction keys to adjust the slope of said line.

6. The calculator of claim 1, wherein said screen is further capable of displaying alpha-numeric characters and said processor is further programmed to display the current equation for said line as said line is redrawn.

7. A method of using a calculator to provide a manual line drawing function, that allows the user to manually position a line on said screen, comprising the steps of:
   receiving a plurality of data points representing a scatter plot and generating a plot of said data points on said screen;
   receiving data representing a line begin point;
   receiving data representing a line end point;
   drawing a line that includes said begin point and said end point;
   receiving user input from directional keys to manually adjusted the position of said line; and
   redrawing said line in accordance with said adjusted position on said scatter plot.

8. The method of claim 7, wherein said line begin point and said line end point are received by means of corresponding cursor locations.

9. The method of claim 7, wherein said line begin point and said line end point are received by means of numerical data entry.

10. The method of claim 7, wherein said line is redrawn in response to said direction keys to adjust the y-intercept of said line.

11. The method of claim 7, wherein said line is redrawn in response to using said direction keys to adjust the slope of said line.

12. The method of claim 7, wherein said screen is further capable of displaying alpha-numeric characters and said processor is further programmed to display the current equation for said line as said line is redrawn.

* * * * *